Feb. 6, 1962 B. BRIGHTMAN 3,020,419

PULSE FREQUENCY DIVIDING SYSTEM USING RING COUNTER AND MEANS TO CANCEL SOME INPUT PULSES

Filed July 28, 1958 3 Sheets-Sheet 1

INVENTOR.
BARRIE BRIGHTMAN
BY F. H. Henson
ATTORNEY

Feb. 6, 1962 B. BRIGHTMAN 3,020,419

PULSE FREQUENCY DIVIDING SYSTEM USING RING COUNTER AND MEANS TO CANCEL SOME INPUT PULSES

Filed July 28, 1958 3 Sheets-Sheet 2

United States Patent Office 3,020,419

Patented Feb. 6, 1962

3,020,419

PULSE FREQUENCY DIVIDING SYSTEM USING RING COUNTER AND MEANS TO CANCEL SOME INPUT PULSES

Barrie Brightman, Rochester, N.Y., assignor to General Dynamics Corporation, Rochester, N.Y., a corporation of Delaware Filed July 28, 1958, Ser. No. 751,430
4 Claims. (Cl. 307—88.5)

This invention relates in general to electronic switching systems and, more particularly, to scanning pulse generators for controlling the scanning of the time division channels of a time division multiplex electronic switching system.

In many electronic switching systems, it is necessary that the time position channels individually assigned to the lines of the system, or to connections established between pairs of lines of the system, be periodically sampled for different types of supervisory information. For example, in the electronic switching telephone system disclosed in copending application Serial No. 721,241, filed March 13, 1958, now Patent No. 2,947,819, and assigned to the same assignee as the present invention, and in which the line terminating units are interconnected by a transmission highway network of the time division channel type, a highway monitor circuit is provided for each transmission highway network for the purpose of detecting a voice frequency release signal appearing on any one of the time division channels when the call on that channel is terminated. As disclosed in the above-identified copending application, the highway monitor circuit serves to connect a multifrequency receiver to the transmission highway network in each of the time positions in turn and since the multifrequency receiver must be rather slow in operation to prevent operation on transients, it is connected to each time position channel for a plurality of time position pulse frames before being advanced to the next succeeding time position channel.

In the system disclosed in the above-identified copending application, the sampling pulses, which control the connection of the multifrequency receiver to the highway, are generated under control of a distributor driven by a multivibrator which is relatively slow in operation as compared to the time position pulse frame rate. Each stage of the distributor controls the gating of the time position defining pulses corresponding to an individual one of the time division channels to the sampling pulse forming circuit. Thus, it is necessary to provide a distributor stage for each time position channel and to transmit the time position defining pulses over individual conductors from the time position pulse generator to the highway monitor circuit. Obviously, this type of operation requires a great deal of equipment and cabling between circuits.

Accordingly, it is the general object of this invention to provide a new and improved electronic switching system.

It is a more particular object of this invention to provide a new and improved scanning pulse generator which is reliable in operation, comprises a minimum of circuit components, and the operation of which is controlled over a minimum number of external conductors.

The scanning pulse generator, which forms the subject matter of this invention, comprises a recycling counting chain, preferably of the binary type, having a number of settings equal to the number of time division channels to be scanned. The time position defining pulses generated by the master pulse source of the system are coupled over a single conductor to the scanning pulse generator and inhibit pulses, which occur in phase with a particular one of the time position defining pulses once for each certain number of pulse frames, are coupled over a second conductor to the scanning pulse generator. The counting chain in the scanning pulse generator is controlled to count all of the time position defining pulses received from the master pulse generator except the time position defining pulse immediately succeeding an inhibit pulse. The scanning pulse generator serves to produce a scanning pulse each time that the counting chain therein recycles to a particular one of its settings. Thus, a scanning pulse is produced in a particular time position for a plurality of pulse frames, an inhibit pulse is then transmitted to the scanning pulse generator, and a scanning pulse in the time position immediately succeeding said particular time position is then produced until another inhibit pulse is received.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise three figures on three sheets.

Figure 2:
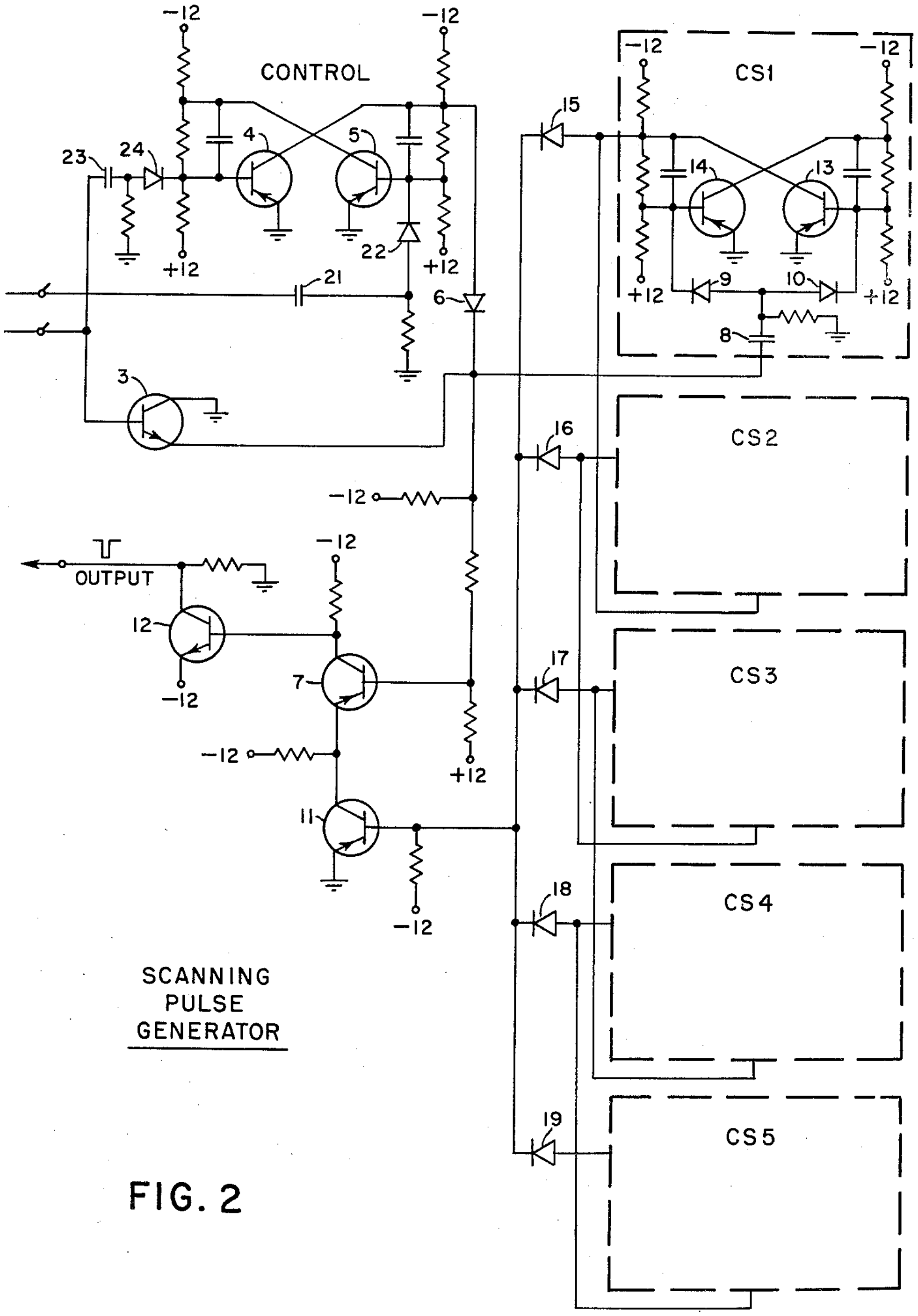
FIG. 2 shows circuit details of a scanning pulse generator.

The scanning pulse generator, shown in FIG. 2, can be incorporated in a highway monitor circuit of the type shown and described in the above-identified copending application or can be used in any other system wherein the continuous scanning of time division channels is required. Most of the circuits external to the scanning pulse generator and which are utilized to control the operation of the scanning pulse generator have been shown in block diagram or simplified form for the purpose of simplifying the disclosure and thus expediting the understanding of the invention.

Figure 3:
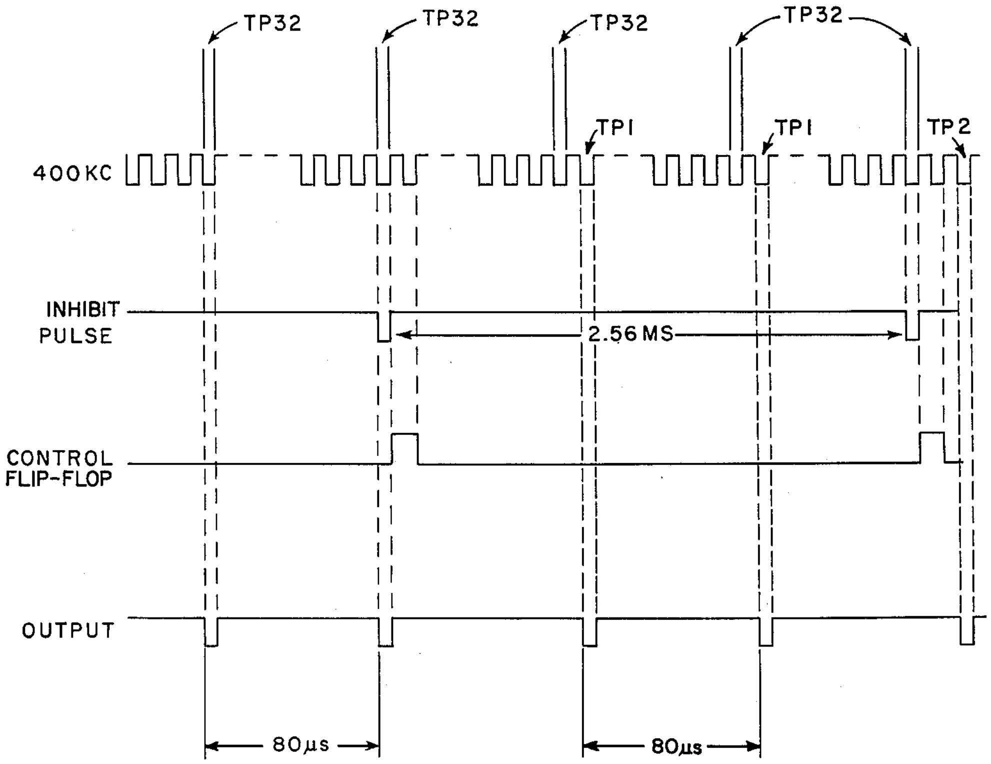
FIG. 3 is a pulse chart which graphically illustrates the operation of the circuit of FIG. 2.

The time position defining pulses for the entire system are generated by the square wave generator or master pulse source 1. As illustrated, master pulse source 1 operates at a frequency of 400 kc. and the output wave form is applied to pulse commutator 2 and to the base of the transistor corresponding to transistor 3 in each scanning pulse generator of the system. Pulse commutator 2 functions to commutate the pulses received from generator 1 to thirty-two output conductors, such as TP1–TP32, in turn, so that a time position defining pulse appears on each of said conductors at a 12.5 kc. rate. Since the output of generator 1 is a square wave form, each pulse appearing on each of the conductors TP1–TP32 is 1.25 microseconds in duration, there is a guard time of 1.25 microseconds between pulses on successive conductors, and each frame of pulses is 80 microseconds in duration, as illustrated in FIG. 3. As fully described in the above-identified application, the pulses appearing on the time position conductors TP1–TP32 are utilized to activate the switches within the line terminating units and registers of the system to connect those circuits to the transmission highway network for the transmission of communication signals between the circuits. Pulse generator 1 and pulse commutator 2 may be of any well known type but are preferably of the type shown and described in detail in copending applicatiton Serial No. 585,184, filed May 16, 1956, and assigned to the same assignee as the present invention.

To illustrate the operation of the scanning pulse generator, assume that the control flip-flop circuit, comprising transistors 4 and 5, is in the condition in which transistor 4 is non-conductive and transistor 5 is conductive so that the anode terminal of inhibiting diode 6 is returned to a negative potential. Under these conditions, the emitter of the gate circuit emitter follower transistor 3 is biased to approximately −12 volt potential and the time position defining pulses, which preferably have an excursion between ground and −12 volt potential and which are generated by master pulse source 1 and applied to the base of transistor 3, are repeated at the emitter of gate circuit transistor 3 and applied to the base of transistor 7 and through capacitor 8 to the anode terminals of steering diodes 9 and 10 in the first stage of the binary counter comprising stages CS1–CS5.

The binary counter, comprising stages CS1–CS5, is designed to have N settings where N time division channels are provided in the system. Thus in the illustrated system, since thirty-two time division channels are provided, the binary counter comprises five stages and, as is well known in the art, has thirty-two unique settings. The binary counting chain controls the pulse gating circuit, comprising transistors 7, 11, and 12, to produce an output scanning pulse only when the counter is in a particular one of its thirty-two settings. In the illustrated circuit, the particular one setting of the counter is the setting in which the transistor corresponding to transistor 14 in each of the counter stage flip-flop circuits is conductive. In this setting, the transistor corresponding to transistor 13 in each flip-flop circuit is non-conductive, the anode terminals of diodes 15—19, which form an "AND" gate for negative signals, are all negative and transistor 11 is held conductive to apply ground potential to the emitter of transistor 7.

It will be recalled that it was assumed that the control flip-flop circuit is in the condition in which transistor 5 is conductive and that transistor 3 is therefore unblocked to repeat the negative pulses received from generator 1 to the base of transistor 7. Let it further be assumed that the pulse applied to the base of transistor 7 at this time occurs in time position 32 and that the previous operation of the scanning pulse generator has been such that the binary counter is now in its particular one setting so that transistor 11 is conductive. Since transistor 11 is conductive and ground potential is therefore applied to the emitter of transistor 7, a positive pulse in time position 32 appears at the collector of transistor 7 and transistor 12 is thereby rendered conductive to apply a negative-going scanning pulse in time position 32 to the output conductor. The scanning pulse applied to the output conductor may be used to activate an electronic switch for the purpose of connecting a multifrequency receiver to a transmission highway network, as previously described. At the termination of the pulse in time position 32 from generator 1, the emitter of transistor 3 goes to ground potential and a positive-going potential pulse is coupled through capacitor 8 and steering diode 9 to render transistor 14 non-conductive and transistor 13 conductive in the counting chain stage CS1. When transistor 13 in stage CS1 becomes conductive, the second stage CS2 is triggered to the condition in which the transistor corresponding to 13 is conductive and, similarly, stages CS3, CS4, and CS5 are triggered to the condition in which the transistor corresponding to 13 in each stage is conductive.

The next occurring time position defining pulse, which is in time position 1, from generator 1 is not repeated by transistor 7 since the output of the "AND" gate, comprising diodes 15—19, is at ground potential and transistor 11 is therefore held non-conductive to prevent transistor 7 from becoming conductive. At the termination of the pulse in time position 1 from generator 1, a positive-going potential pulse is coupled through capacitor 8 and steering diode 10 to reset stage CS1 to the condition in which transistor 13 is non-conductive. Stage CS2 is not triggered when transistor 13 of stage CS1 becomes non-conductive since a positive pulse is required to trigger the flip-flop counting stages. Stage CS1 is triggered at the termination of each negative pulse from generator 1 and, as is well known in the art, stage CS2 is triggered on each alternate operation of stage CS1, stage CS3 is triggered on each alternate operation of stage CS2, etc. Thus, the counting chain counts thirty-two successive pulses from generator 1 without producing an output pulse since the anode terminal of one or more of the diodes 15—19 is held at ground potential to prevent the conduction of transistors 11, 7, and 12. At the termination of the thirty-second pulse, the counting chain is recycled to the setting in which the transistor corresponding to 13 in each stage is non-conductive, the output of the "AND" gate for negative signals goes negative, and transistor 11 is rendered conductive. Now, when the pulse in time position 32 is received from generator 1, transistors 7 and 12 are rendered conductive and a negative-going scanning pulse in time position 32 is applied to the output conductor. The scanning pulse generator continues to generate a scanning pulse in time position 32 in each pulse frame, as just described, until an inhibit pulse is received from the inhibit pulse generator.

Figure 1:
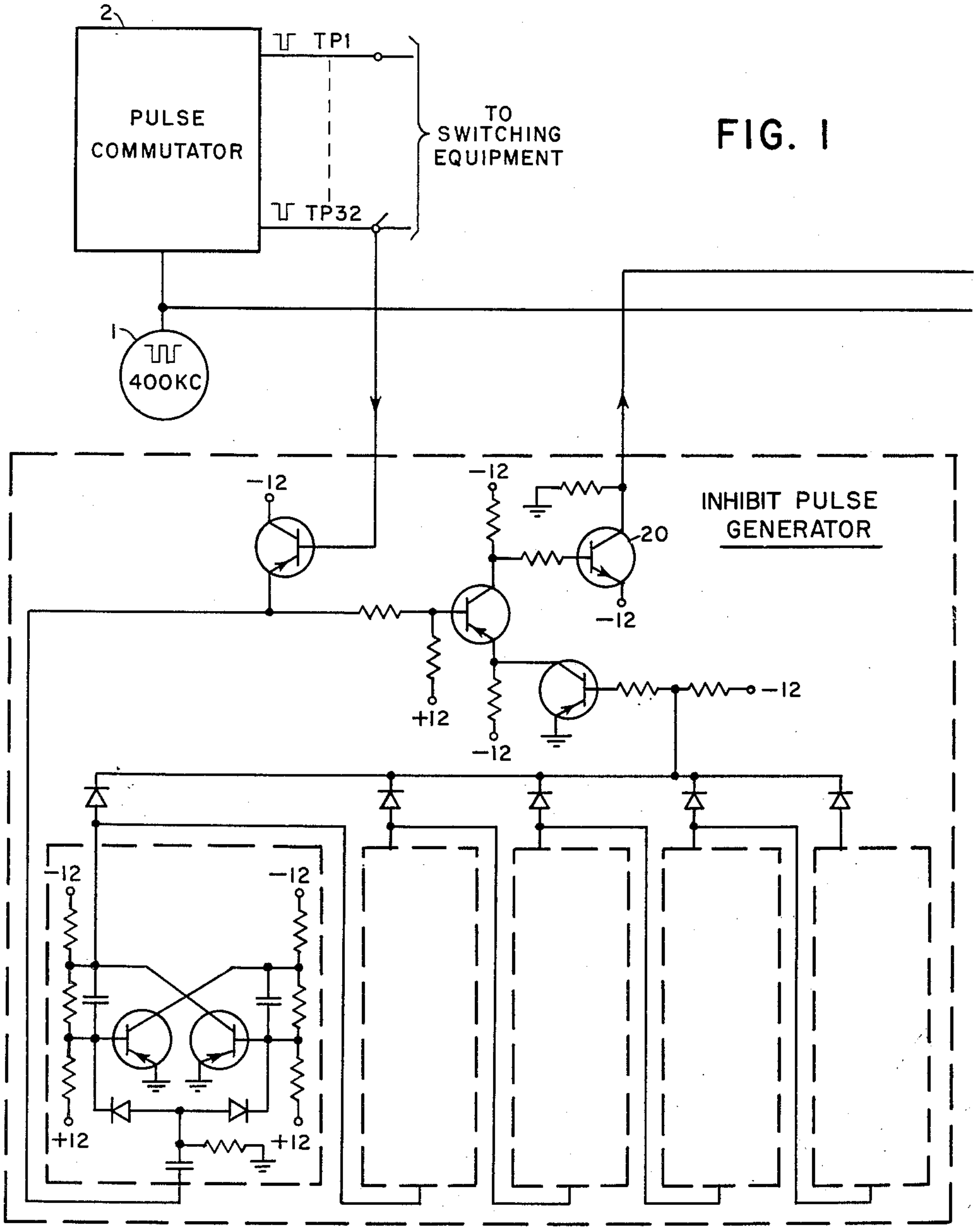
FIG. 1 shows a portion of an electronic switching system in block form and circuit details of an inhibit pulse generator.

The inhibit pulse generator, which is shown in FIG. 1, is provided in the system for the purpose of producing inhibit pulses which occur in phase with a particular one of the time position defining pulses once for each certain number of pulse frames. The illustrated inhibit pulse generator is controlled to count the pulses appearing on conductor TP32 and since a pulse occurs on conductor TP32 once every eighty microseconds and since the inhibit pulse generator comprises a five-stage binary counter, identical to the scanning pulse generator counter just described, an inhibit pulse occurs in time position 32 at the collector of transistor 20 every 2.56 milliseconds. Of course, the pulses on any one of the conductors TP1–TP32 can be used to control the operation of the inhibit pulse generator and the number of stages in the inhibit pulse generator counter is determined solely by the dwell time required by the multifrequency receiver to detect a signal on a time division channel.

The inhibit pulses appearing at the collector of transistor 20 are coupled through a capacitor corresponding to 21 to the anode terminal of a diode corresponding to 22 in the control flip-flop circuit in each scanning pulse generator provided in the system. In the illustrated system, a negative-going inhibit pulse occurs in time position 32 and is thus in phase with the negative-going time position defining pulse 32 from generator 1. The negative-going inhibit pulse coupled through capacitor 21 is blocked from the control flip-flop circuit by reverse biased diode 22 and the pulse in time position 32 from generator 1 is repeated by transistors 3, 7, and 12 to the output conductor, as previously described. At the termination of the inhibit pulse, a positive-going pulse corresponding to the trailing edge of said inhibit pulse is coupled through dode 22 and the control flip-flop circuit is triggered to the condition wherein transistor 4 is conductive and transistor 5 is non-conductive. Also, at the termination of the time position defining pulse from generator 1, the scanning pulse generator counter is advanced one step, as previously described.

When transistor 4 becomes conductive, ground potential is applied to the emitter of gate circuit transistor 3 through diode 6 so that the next occurring negative pulse, which is in time position 1, from generator 1 is not repeated by emitter follower transistor 3 and the counter is thereby prevented from advancing one step at the termination of that pulse. At the terminaion of the pulse in time position 1 from generator 1, a positive-going potential pulse is coupled through capacitor 23 and diode 24 to reset the control flip-flop circuit to the condition in which transistor 4 is non-conductive and transistor 5 is conductive. When transistor 4 become conductive, the ouput of emitter follower transistor 3 is no longer inhibited and the operation of the circuit continues exactly as previously described except that the output pulse now occurs in time position 1. Thus, it can be seen that each inhibit pulse coupled to the scanning pulse generator serves to inhibit the counter in that circuit from counting the next succeeding pulse from generator 1 and the scanning pulse generator then generates a scanning pulse in the time position of the next succeeding channel until the next inhibit pulse is received. The just described operation is graphically illustrated in FIG. 3 of the drawings.

While there has been shown and described what is at present considered to be the preferred embodiment of the invention, modifications thereto will readily occur to those skilled in the art. It is not desired, therefore, that the invention be limited to the embodiment shown and described and it is intended to cover in the appended claims all such modifications as fall within the true spirit and scope of the invention.

What is claimed is:

1. In combination, means for generating N time position defining pulses which recur in repetitive time position frames, a recycling pulse operated counting chain having N settings, a gate circuit for normally coupling said time position defining pulses to said counting chain to advance the setting of said counting chain, means for periodically inhibiting said gate circuit during the occurrence of a particular one of said time position defining pulses to thereby prevent said counting chain from counting that pulse, and means for producing an output pulse each time that said counting chain is in a particular one of its N settings.

2. In combination, means for generating N time position defining pulses which recur in repetitive time position pulse frames, a recycling pulse operated counting chain having N settings, a gate circuit for normally coupling said time position defining pulses to said counting chain, means in said counting chain for advancing the setting of said counting chain one step at the termination of each time position defining pulse coupled through said gate circuit, means for periodically inhibiting said gate circuit during the occurrence of a particular one of said time position defining pulses to thereby prevent said counting chain from advancing its setting at the termination of that pulse, and means for producing an output pulse when a time position defining pulse is coupled through said gate circuit only if said counting chain is in a particular one of its N settings.

3. In combination, means for generating N time position defining pulses which recur in repetitive time position pulse frames, a recycling pulse operated counting chain having N settings, a gate circuit for normally coupling said time position defining pulses to said counting chain to advance the setting of said counting chain, means for inhibiting said gate circuit during the occurrence of a particular one of said time position defining pulses once for each certain number of pulse frames, and means for producing an output pulse each time that said counting chain is in a particular one of its N settings.

4. In combination, means for generating N time position defining pulses which recur in repetitive time position pulse frames, a recycling pulse operated counting chain having N settings, a gate circuit for normally coupling said time position defining pulses to said counting chain, means in said counting chain for advancing the setting of said counting chain one step at the termination of each time position defining pulse coupled through said gate circuit, means for inhibiting said gate circuit during the occurrence of a particular one of said time position defining pulses once for each certain number of pulse frames, and means for producing an output pulse when a time position defining pulse is coupled through said gate circuit only if said counting chain is in a particular one of its N settings.

References Cited in the file of this patent

UNITED STATES PATENTS

| | | |
|---|---|---|
| 2,833,920 | Buley | May 6, 1958 |
| 2,844,790 | Thompson | July 22, 1958 |

OTHER REFERENCES

"Arithmetic Operations in Digital Computers" by Richards, copyright 1955, page 201.